United States Patent
Li et al.

(10) Patent No.: US 10,279,524 B2
(45) Date of Patent: May 7, 2019

(54) MOUNTING STAND FOR INJECTION APPARATUS AND INJECTION MOLDING APPARATUS

(71) Applicant: FANUC Corporation, Yamanashi (JP)

(72) Inventors: Zhenxing Li, Yamanashi (JP); Koichi Nishimura, Yamanashi (JP); Satoshi Yano, Yamanashi (JP); Keisuke Sugahara, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 276 days.

(21) Appl. No.: 15/417,685

(22) Filed: Jan. 27, 2017

(65) Prior Publication Data

US 2017/0217064 A1    Aug. 3, 2017

(30) Foreign Application Priority Data

Jan. 29, 2016   (JP) .................................. 2016-016543

(51) Int. Cl.
*B29C 45/17*    (2006.01)
*B29C 45/03*    (2006.01)
(Continued)

(52) U.S. Cl.
CPC .......... *B29C 45/1742* (2013.01); *B29C 45/03* (2013.01); *B29C 45/07* (2013.01);
(Continued)

(58) Field of Classification Search
CPC ......... B29C 45/03; B29C 45/07; B29C 45/17; B29C 45/1742; B29C 45/1761; B29C 45/70; F16M 11/043
See application file for complete search history.

(56) References Cited

U.S. PATENT DOCUMENTS

| 3,909,173 A | 9/1975 | Latter |
| 4,749,350 A * | 6/1988 | Fritsch .................... B29C 45/07 425/451 |

(Continued)

FOREIGN PATENT DOCUMENTS

| JP | 36-22431 B | 11/1961 |
| JP | 37-15923 B | 10/1962 |

(Continued)

OTHER PUBLICATIONS

Office Action in JP Application No. 2016-016543, dated Apr. 3, 2018, 7 pp.
(Continued)

*Primary Examiner* — James P Mackey
(74) *Attorney, Agent, or Firm* — Hautpman Ham, LLP (57) ABSTRACT

A mounting stand for an injection molding machine has a base member and an erecting member, to which an injection apparatus is attached, vertically arranged on the base member, and is movable with respect to a support supporting the base member. The mounting stand includes a base member protruding portion provided upward from the base member around a portion at which the base member comes into contact with the erecting member, and an anchored portion at which a side surface of the base member protruding portion is anchored to a side surface of the erecting member.

7 Claims, 5 Drawing Sheets

(51) Int. Cl.
  *B29C 45/64* (2006.01)
  *F16M 11/04* (2006.01)
  *F16M 11/16* (2006.01)
  *B29C 45/07* (2006.01)
  *B29C 45/70* (2006.01)

(52) U.S. Cl.
  CPC ............ *B29C 45/17* (2013.01); *B29C 45/64* (2013.01); *F16M 11/041* (2013.01); *F16M 11/043* (2013.01); *F16M 11/16* (2013.01); *B29C 45/1761* (2013.01); *B29C 45/70* (2013.01)

(56) References Cited

U.S. PATENT DOCUMENTS

| | | | | |
|---|---|---|---|---|
| 6,572,362 | B2 * | 6/2003 | Boyd | B29C 45/1773 264/328.11 |
| 7,833,008 | B2 | 11/2010 | Wimberger | |
| 9,283,705 | B2 * | 3/2016 | Yano | B29C 45/1744 |

| | | |
|---|---|---|
| 2003/0026866 | A1 | 2/2003 Boyd |

FOREIGN PATENT DOCUMENTS

| | | |
|---|---|---|
| JP | 41-12512 B | 7/1966 |
| JP | 47-25253 A | 10/1972 |
| JP | 58-194856 U | 12/1983 |
| JP | 61-11209 A | 1/1986 |
| JP | 61-219616 A | 9/1986 |
| JP | 7-308935 A | 11/1995 |
| JP | 11-324139 A | 11/1999 |
| JP | 2003103557 A | 4/2003 |
| JP | 2005262849 A | 9/2005 |
| JP | 2008-55713 A | 3/2008 |
| JP | 3161796 U | 8/2010 |

OTHER PUBLICATIONS

Office Action in JP Application No. 2016-016543, dated Jan. 9, 2018, 6 pp.

* cited by examiner

ARROW VIEW IN DIRECTION A

FIG. 1C

CROSS-SECTIONAL VIEW OF B

ARROW VIEW IN DIRECTION A

FIG. 2C

CROSS-SECTIONAL VIEW OF B

ARROW VIEW IN DIRECTION A

FIG. 3C

CROSS-SECTIONAL VIEW OF B

MOUNTING STAND FOR INJECTION APPARATUS AND INJECTION MOLDING APPARATUS

RELATED APPLICATIONS

The present application claim priority to Japanese Patent Application Number 2016-016543, filed Jan. 29, 2016, the disclosure of which is hereby incorporated by reference herein in its entirety.

BACKGROUND OF THE INVENTION

1. Field of the Invention

The present invention relates to a mounting stand for an injection apparatus and an injection molding apparatus, and particularly relates to a mounting stand to which a vertical type injection apparatus is attached.

2. Description of the Related Art

In a mounting stand to which an injection apparatus of an injection molding machine is movably attached, the attached injection apparatus needs to be stably fixed. In addition, in the mounting stand, vibration is generated when the injection apparatus moves with respect to the mounting stand or when the injection apparatus is driven, and thus stability is required with respect thereto. In particular, in the case of a vertical type injection apparatus, the center of gravity thereof is high, and thus stability is further required. In addition, the mounting stand itself is movable while the injection apparatus is attached thereto.

An example of a conventional art related to the mounting stand for the injection apparatus is disclosed in U.S. Pat. No. 7,833,008. The mounting stand has a substantially triangular shape when viewed from a side of an injection unit. In addition, a frame is provided along a longitudinal direction of an upper part of a horizontal mold clamping unit, and a guide rail is provided on this frame. Further, the mounting stand is movable on the frame by being guided on the guide rail. According to this configuration, in the mounting stand, the injection unit may be disposed according to the dimensions of a mold. Such a mounting stand is greatly excellent in weight and occupied space in terms of stability.

In addition, another example of the conventional art related to the mounting stand for the injection apparatus is disclosed in JP 2003-103557A. The mounting stand has an apex movement structure including a base plate, a pair of substantially triangular side plates provided to the base plate at both ends thereof, and a reinforcement plate extending between the pair of side plates. A cut-out part for lightening is provided in each of the pair of side plates and the reinforcement plate. In addition, there is a complementary relation between a rail support provided on an outer side of a lower end edge of the side plates of the apex movement structure and a rail provided on an inner side of a side plate of a base structure. According to this configuration, the mounting stand to which the injection apparatus is attached is movable with respect to the base structure. According to this configuration, the mounting stand is applicable to molds having a plurality of sizes and shapes. Such a mounting stand is lighter than the mounting stand as in U.S. Pat. No. 7,833,008 described above. However, an occupied space thereof is not changed much.

Further, another example of the conventional art related to the mounting stand for the injection apparatus is disclosed in JP 2005-262849 A. The mounting stand includes a unit base, a pair of support posts vertically arranged by fixing lower ends thereof to the unit base, and a support post connecting member that connects upper ends of the pair of support posts to each other. In addition, a tie bar of an upper part is inserted into an opening of a base portion of the unit base between a fixed die plate and a movable die plate. According to this configuration, the mounting stand to which the injection apparatus is attached is movable with respect to the tie bar. According to this configuration, a position of the injection apparatus can be aligned to a resin insertion hole of a nozzle touch socket formed in a mold. In such a mounting stand, an occupied space is reduced since the pair of support posts is vertically arranged on a horizontal member of the unit base.

In the above-described mounting stand disclosed in JP 2005-262849 A, even though the occupied space is small, the support post easily vibrates at the time of movement or driving, and the injection apparatus easily becomes unstable. In addition, an operation of attaching and detaching a mold and a platen is generated at the time of mold exchange work. Meanwhile, the mounting stand disclosed in JP 2005-262849 A moves along the tie bar between a fixed platen and a movable platen, and thus is obstructive to the mold exchange work. A structure for easily retreating the injection apparatus or the mounting stand from above the mold is desired at the time of such work. However, in the above-described mounting stand disclosed in U.S. Pat. No. 7,833, 008 or JP 2003-103557 A, the rail needs to be disposed outside of the mold side of the platen, and a frame, etc. supporting the rail is provided accordingly. As a result, there is a problem of an increase in size, a cost increase, etc.

SUMMARY OF THE INVENTION

In this regard, in view of the above-mentioned problem of the conventional art, an object of the invention is to provide a mounting stand for an injection apparatus having a small occupied space and high stability. In addition, another object is to provide amounting stand capable of easily retreating an injection apparatus or a mounting stand from above a mold at the time of mold exchange work. Further, another object is to provide an injection molding apparatus capable of suppressing an occupied space of a support for moving the mounting stand.

A first mode of amounting stand for an injection apparatus according to the invention includes: a base member; an erecting member which is vertically arranged on the base member and to which the injection apparatus is attached; a base member protruding portion provided on an upper surface of the base member around a portion of the base member that comes into contact with the erecting member; and an anchored portion at which a side surface of the base member protruding portion is anchored to a side surface of the erecting member, wherein the mounting stand is movable with respect to a support that supports the base member.

A second mode of a mounting stand for an injection apparatus according to the invention includes: a base member; an erecting member which is vertically arranged on the base member and to which the injection apparatus is attached; an erecting member protruding portion provided on a side surface of the erecting member around a portion of the erecting member that comes into contact with the base member; and an anchored portion at which a lower surface of the erecting member protruding portion is anchored to an upper surface of the base member, wherein the mounting stand is movable with respect to a support that supports the base member.

A third mode of a mounting stand for an injection apparatus according to the invention includes: a base member; an erecting member which is vertically arranged on the base member and to which the injection apparatus is attached; a base member protruding portion provided on an upper surface of the base member around a portion of the base member that comes into contact with the erecting member; an erecting member protruding portion provided on a side surface of the erecting member around a portion of the erecting member that comes into contact with the base member; and an anchored portion at which a side surface of the base member protruding portion is anchored to a side surface of the erecting member protruding portion, wherein the mounting stand is movable with respect to a support that supports the base member. The erecting member protruding portion may be engaged with the base member protruding portion.

In the mounting stand of the first, second, and the third mode, described above, the anchored portion may be anchored by a bolt.

An injection molding machine according to the invention includes the mounting stand of the first, second, or the third mode as described above, and a support that supports the base member of the mounting stand, wherein a supported portion is provided, along a direction in which the mounting stand is movable, to the base member of the mounting stand at a portion where the base member is supported by the support, and the support is provided to a mold clamping device.

The support may be provided on a frame of the mold clamping device, a fixed platen of the mold clamping device, or a movable platen of the mold clamping device.

According to the invention, it is possible to provide a mounting stand for an injection molding machine having high stability in which an occupied space of an injection apparatus is small.

Further, according to the invention, it is possible to provide an injection molding apparatus capable of easily retreating an injection apparatus or amounting stand from above a mold at the time of work such as mold exchange and capable of suppressing an occupied space of a support for moving the mounting stand.

DETAILED DESCRIPTION OF THE PREFERRED EMBODIMENTS

First, a description will be given of a first embodiment of an injection molding apparatus including a mounting stand of the invention using FIG. 1A, FIG. 1B, and FIG. 1C.

Figure 1A:
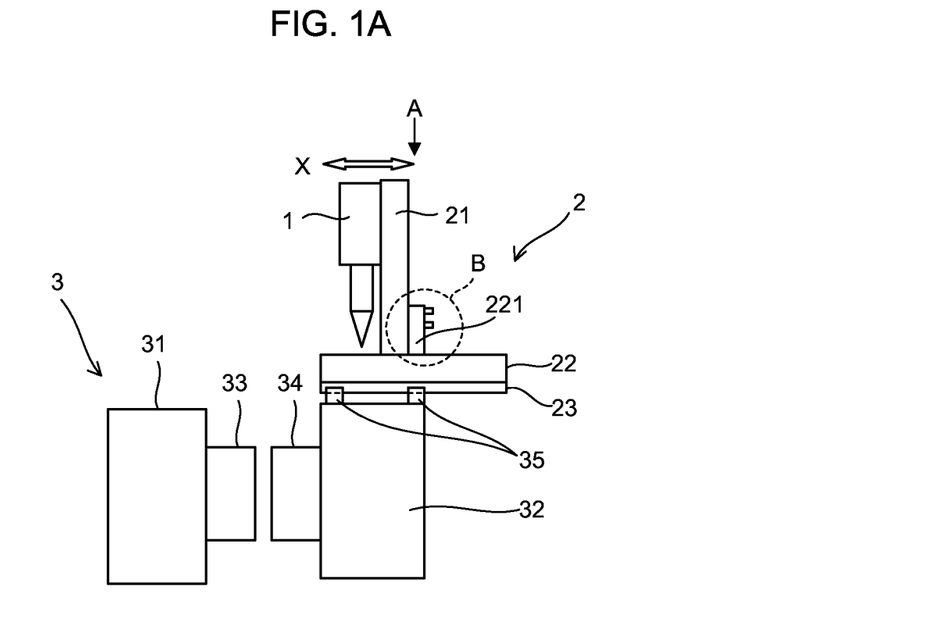
FIG. 1A is an overall view of an injection molding apparatus including a mounting stand according to a first embodiment of the invention.

FIG. 1A is an overall view of the injection molding apparatus including amounting stand 2 according to the present embodiment.

An injection apparatus 1 is attached to the mounting stand 2. The mounting stand 2 is disposed above a mold clamping device 3. The injection molding apparatus closes and clamps molds 33 and 34 using the mold clamping device 3, injects a material into the molds 33 and 34 from the injection apparatus 1, and takes out a molded article from the molds 33 and 34.

An outline of a molding operation of the injection molding apparatus will be shown below.

The mold 33 is attached to a movable platen 31, the mold 34 is attached to a fixed platen 32, the movable platen 31 is moved toward the fixed platen 32, and the mold 33 and the mold 34 are closed to form an injection space. Then, the mounting stand 2 to which the injection apparatus 1 is attached is moved with respect to the mold clamping device 3, the injection apparatus 1 is moved with respect to the mounting stand 2, and a material is injected to the injection space formed in the molds 33 and 34 from the injection apparatus 1. After a predetermined time passes, the movable platen 31 is moved in a direction of becoming more distant from the fixed platen 32, the mold 33 and the mold 34 are opened, and a molded article is taken out.

In addition, at the time of mold exchange in which a different mold is used or operation related to an attached and detached portion of the platen and the mold such as an inspection of connection between the mold and the platen, the injection apparatus 1 and the mounting stand 2 are moved such that the operation is not inhibited. The injection apparatus 1 and the mounting stand 2 as illustrated in FIG. 1A are located at positions where they retreat so as not to pose any obstacle to the operation. A movement direction of the mounting stand 2 with respect to the mold clamping device 3 is a direction of an arrow X as illustrated in FIG. 1A.

The mounting stand 2 is moved when a supported portion 23 fixed to the mounting stand 2 moves with respect to a support 35 that supports the supported portion 23.

Hereinafter, a description will be given of each component included in the injection molding apparatus.

The injection apparatus 1 is a vertical type injection apparatus. The injection apparatus 1 is attached to an erecting member 21 of the mounting stand 2 described below such that the injection apparatus 1 is movable in a vertical direction.

The mounting stand 2 includes an erecting member 21 and a base member 22 on which the erecting member 21 is vertically arranged, and further includes an anchored portion 24 described below. As illustrated in FIG. 1A, a whole shape of the mounting stand 2 corresponds to a substantially inverted T-shape when viewed from a side. Since the mounting stand 2 has such a shape, the mounting stand 2 can be more lightened and have a smaller occupied space when compared to the mounting stand having the substantially triangular shape as disclosed in U.S. Pat. No. 7,833,008 which is the above-described conventional art document.

Figure 1B:
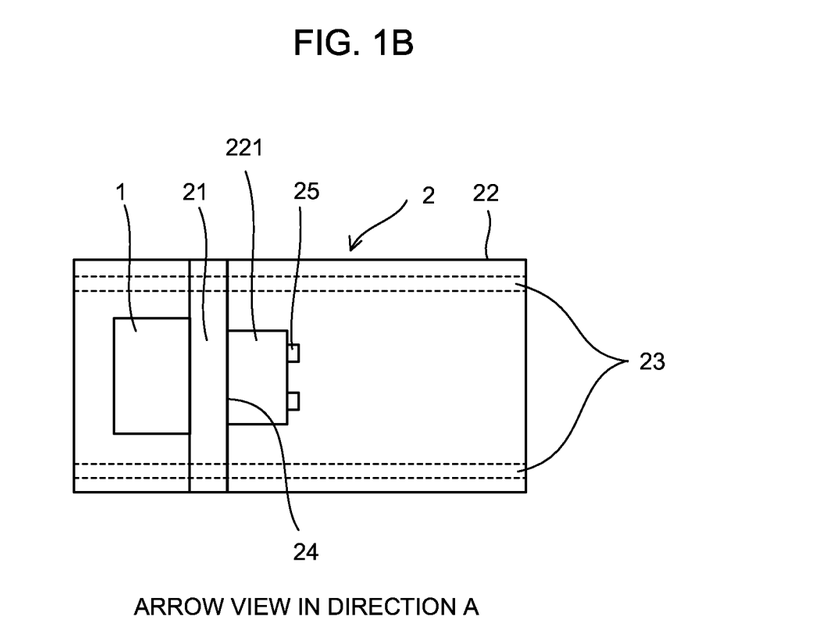
FIG. 1B is a diagram of the mounting stand illustrated in FIG. 1A as viewed in a direction A.

In FIG. 1A or FIG. 1B, the erecting member 21 has a prismatic body with a rectangular cross section, and is provided to extend in a vertical direction from the base member 22. In addition, as illustrated in FIG. 1C, a bolt hole 212 corresponding to a bolt 25 is provided on one side surface of the erecting member 21 around a portion coming into contact with the base member 22 and at a place coming into contact with a side surface of a base member protruding portion 221 described below.

The erecting member 21 may be vertically arranged on the base member 22, and a shape, a material, etc. thereof are not particularly restricted. FIG. 1A or FIG. 1B illustrates that the erecting member 21 has the rectangular cross section and extends in the vertical direction. However, the erecting member 21 is not restricted to these shapes. In addition, every method may be used to vertically arrange the erecting member 21 on the base member 22. For example, a lower surface of the erecting member 21 may be attached to an upper surface of the base member 22 using welding, etc.

Figure 1C:
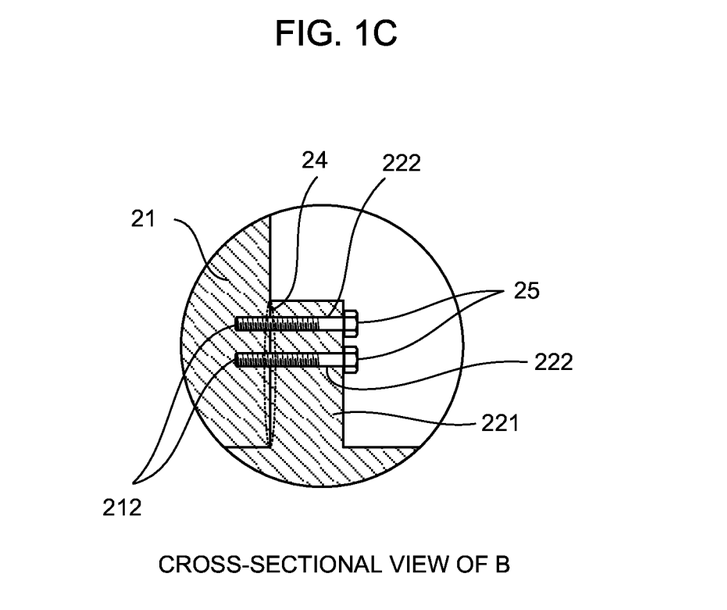
FIG. 1C is an enlarged cross-sectional view of a portion B indicated by a dotted line in FIG. 1A.

As illustrated in FIG. 1A to FIG. 1C, the base member protruding portion 221 is provided on the upper surface of the base member 22. A through-hole 222 for the bolt 25 is provided in the base member protruding portion 221. Similarly to the erecting member 21, a shape, a material, etc. of the base member 22 are not particularly restricted, which is also similarly applied to the base member protruding portion 221. The base member protruding portion 221 may be molded integrally with the base member 22, or may be a separate member attached to the base member 22.

The anchored portion 24 (a portion indicated by being surrounded by a dotted line of FIG. 1C) is configured when the side surface of the base member protruding portion 221 comes into contact with and is anchored to the side surface of the erecting member 21. Specifically, as illustrated in FIG. 1C, the bolt 25 is inserted into the through-hole 222 provided in the base member protruding portion 221 and screw-fastened to the bolt hole 212 provided on the side surface of the erecting member 21. In this way, the erecting member 21 is more strongly fixed to the base member 22, and stability is enhanced. A range (a contact area, etc.) of the anchored portion 24 is set by taking into consideration a stability of the erecting member 21 with respect to the base member 22. In addition, rigidities of the erecting member 21 and the base member protruding portion 221 are considered. However, when the anchored portion 24 is set to be excessively large, an occupied space thereof becomes large. Thus, a part in which the base member 22 comes into contact with the erecting member 21 is not provided up to a high position in the erecting member 21.

In addition, at the time of operation of assembling the erecting member 21 with the base member 22, the operation can be performed by aligning the erecting member 21 with the base member protruding portion 221 due to the presence of the base member protruding portion 221. Thus, positioning is easily performed, which contributes to efficiency of the operation.

As a configuration of the anchored portion 24, anchoring using an appropriate method such as welding may be employed instead of anchoring using the bolt 25, and a combination with the bolt is allowed.

The supported portion 23 is provided on the base member 22. In addition, the supported portion 23 is provided to extend to be long along the movement direction of the mounting stand 2. Specific examples of the supported portion 23 include a rail.

In FIG. 1A and FIG. 1B, the supported portion 23 is provided on a lower surface side of the base member 22. However, an installation place thereof is not restricted as long as the supported portion 23 is supported by the support 35. For example, when the support 35 is provided on a side surface side of the base member 22, the supported portion 23 is provided at an installation place corresponding thereto. When the support 35 is provided on an upper surface side of the base member 22, the supported portion 23 is provided at an installation place corresponding thereto. In other words, the support 35 supports the supported portion 23 from above. In addition, in FIG. 1A and FIG. 1B, the supported portion 23 is provided in two rows in a width direction across a whole length of the base member 22. However, the invention is not restricted thereto. A range in which the mounting stand 2 is movable may be covered, and the number of rows may be appropriately set. Additionally, although not illustrated, an opening or a notch may be provided in the base member 22 such that vertical movement of the injection apparatus 1 is not hindered.

The mold clamping device 3 is a horizontal mold clamping device, and includes the movable platen 31, the fixed platen 32, and the support 35. The molds 33 and 34 are attachable and detachable to and from the movable platen 31 and the fixed platen 32, respectively.

The support 35 is provided in the mold clamping device 3. Specific examples of the support 35 include a bearing, a roller, etc. The support 35 may be configured as a separate member such as the bearing or the roller, or may be included in a portion of a member of the mold clamping device 3 in which the support 35 is provided. An installation place thereof is provided on the fixed platen 32 included in the mold clamping device 3 in FIG. 1A. However, the support 35 may be provided on the movable platen 31 (not illustrated). In addition, when the mold clamping device 3 includes a frame (not illustrated), the support 35 may be provided on the frame.

In FIG. 1A, the support 35 is provided at two places in one row of the supported portion 23 in side view, which may be appropriately changed as necessary. When the support 35 is provided as described above, a whole space for installing the supported portion 23 which needs to cover the range in which the mounting stand 2 is movable may not be provided in the mold clamping device 3, and thus space saving of the mold clamping device 3 can be implemented. Specifically, the dimensions of the fixed platen 32 may not be large when the support 35 is provided on the fixed platen 32, the dimensions of the movable platen 31 may not be large when the support 35 is provided on the movable platen 31, and the dimensions of the frame (not illustrated) may not be large when the support 35 is provided on the frame. In addition, when the support 35 is installed on the movable platen 31 or the fixed platen 32, a frame may not be provided to provide the mounting stand 2. When the support 35 is provided on the frame, a necessary length of the frame in the movement direction of the mounting stand 2 can be suppressed since the support 35 is provided on the frame rather than the supported portion 23 provided in the movement direction.

When rigidities of the erecting member 21 and the base member 22 are insufficient at the time of assembly work using lifting equipment in which the mounting stand 2 is installed in the support 35 provided in the mold clamping device 3, a position of the mounting stand 2 is unstable, and the work has a problem in safety. However, the position of the mounting stand 2 is stabilized by the above-described anchored portion, and thus safety is improved.

The mounting stand 2 is moved with respect to the support 35 at the time of mold exchange in which a different mold is used or operation related to the attached and detached portion of the platen and the mold such as the inspection of connection between the mold and the platen as described above, and in order to adjust a position to an injection hole at the time of driving the injection apparatus 1. When the support 35 is provided on the fixed platen 32 as illustrated in FIG. 1A, and the base member 22 of the mounting stand 2 is moved up to a retreat position at which the base member 22 protrudes to a side opposite to the mold 34 of the fixed platen 32, the injection apparatus 1 and the mounting stand 2 do not hinder the operation related to the attached and detached portion of the platen and the mold at the time of the operation. Meanwhile, at the time of driving (not illustrated), the base member 22 of the mounting stand 2 is moved up to a driving position at which the mounting stand 2 protrudes to the mold 34 side of the fixed platen 32.

In addition, since the mounting stand 2 is lightened, and an occupied space thereof is suppressed, even when the mounting stand 2 moves to the retreat position or the driving position, and the base member 22 protrudes, a lifting force (a force of lowering a portion at which the base member 22 protrudes and lifting an opposite side thereof in FIG. 1A) rarely acts on a side opposite to a protruding side. It is possible to employ a structure in which, even when the lifting force is generated, the supported portion 23 can be pressed by the support 35 to deal with the lifting force.

In the present embodiment, the side surface of the base member protruding portion 221 provided on the base member 22 is anchored to the side surface of the erecting member 21. However, an erecting member protruding portion may be provided on the side surface of the erecting member 21, and a lower surface of the erecting member protruding portion may be anchored to the upper surface of the base member 22, thereby configuring an anchored portion. In this case, unlike the anchored portion 24 in the vertical direction as illustrated in FIG. 1C, the anchored portion is in a horizontal direction, and a bolt is provided in the vertical direction accordingly.

Next, a description will be given of a second embodiment of the injection molding apparatus including the mounting stand of the invention using FIG. 2A, FIG. 2B, and FIG. 2C. A description overlapping the first embodiment of the invention described above will be omitted.

Figure 2A:
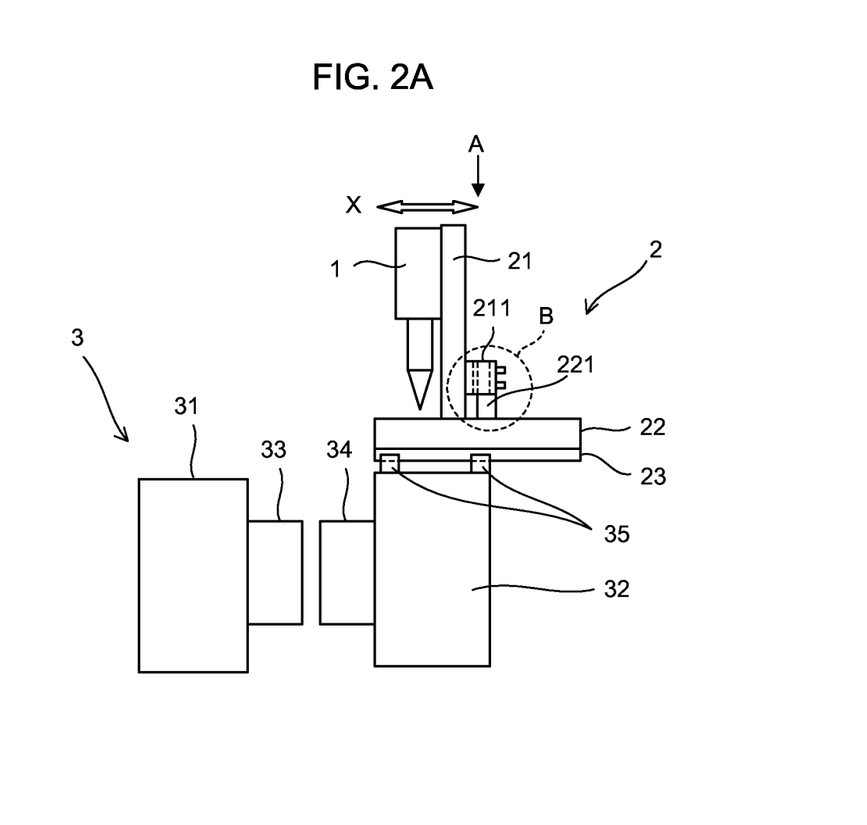
FIG. 2A is an overall view of an injection molding apparatus including a mounting stand according to a second embodiment of the invention.
Figure 2B:
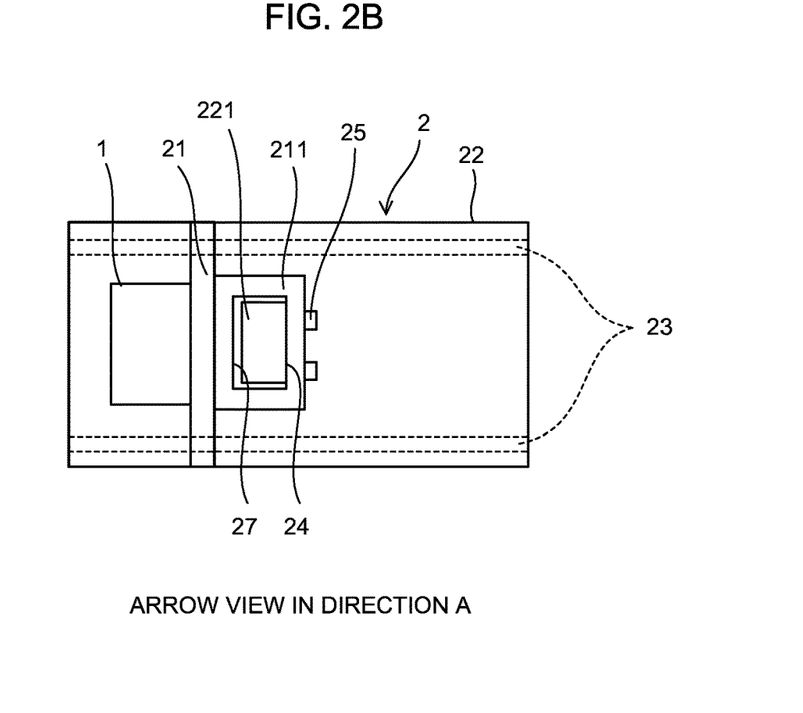
FIG. 2B is a diagram of the mounting stand illustrated in FIG. 2A as viewed in a direction A.
Figure 2C:
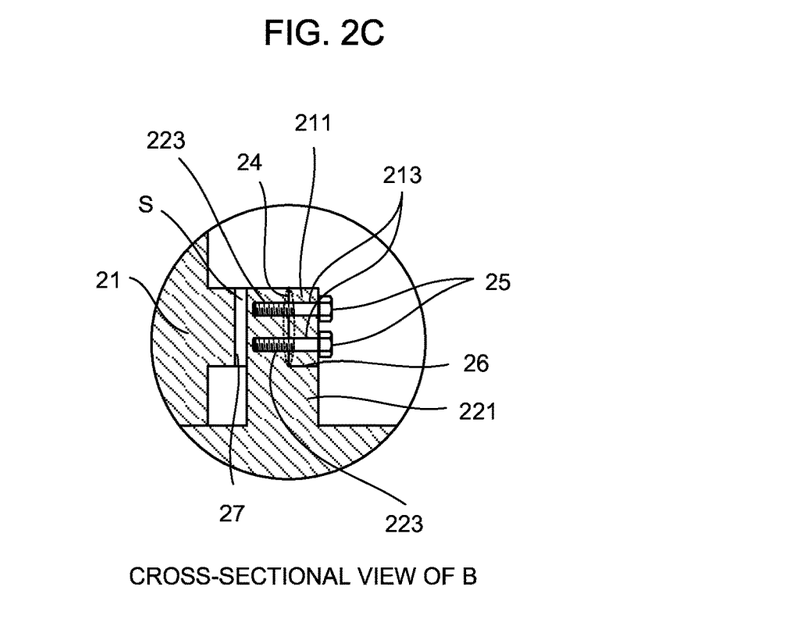
FIG. 2C is an enlarged cross-sectional view of a portion B indicated by a dotted line in FIG. 2A.

As illustrated in FIG. 2A to 2C, the present embodiment is characterized in that an erecting member protruding portion 211 is provided on an erecting member 21, in addition to a base member protruding portion 221 provided on a base member 22. As illustrated in FIG. 2A to 2C, the base member protruding portion 221 provided on the base member 22 is provided to laterally protrude from a side surface of the erecting member 21 around a portion of the erecting member 21 that comes into contact with the base member 22 (that is, around a lower end of the erecting member 21). An opening 27 is provided in the vertical direction in the erecting member protruding portion 211. The opening 27 is provided to allow the base member protruding portion 221 provided on the base member 22 to insert.

As illustrated in FIG. 2C, a through-hole 213 into which a bolt 25 is inserted is provided in the erecting member protruding portion 211 on a side opposite to the erecting member 21 with the opening 27 interposed therebetween. In addition, as illustrated in FIG. 2C, a lower end of the erecting member protruding portion 211 comes into contact with a step portion 26 provided in the base member protruding portion 221. In this way, an anchored portion 24 configured when a side surface of the base member protruding portion 221 comes into contact with, and is anchored to, the side surface of the erecting member 21 is strengthened, and stability of the mounting stand 2 is enhanced. The lower end of the erecting member protruding portion 211 may be configured to come into contact with an upper surface of the base member 22. In this case, it is not necessary to provide such a step portion 26 in the base member protruding portion 221. The erecting member protruding portion 211 may an integral part of the erecting member 21, or may be a separate member from the erecting member 21.

As illustrated in FIG. 2A to 2C, the base member protruding portion 221 provided on the base member 22 is provided to protrude upward from a part around a portion that comes into contact with the erecting member 21 on the upper surface of the base member 22. As illustrated in FIG. 2C, the step portion 26 is provided in the base member protruding portion 221. A portion above the step portion 26 is inserted into the opening 27 of the erecting member protruding portion 211. As illustrated in FIG. 2C, a bolt hole 223 engaged with a screw portion of the bolt 25 is provided in a portion of the base member protruding portion 221 inserted into the opening of the erecting member protruding portion 211. The base member protruding portion 221 may be an integral portion of the base member 22, or may be a separate member from the base member 22.

As illustrated in FIG. 2C, the anchored portion 24 is configured by inserting the bolt 25 into the through-hole 213 of the erecting member protruding portion 211, and screw-fastening a distal end screw portion of the bolt 25 to the bolt hole 223 of the base member protruding portion 221 while a side surface of a portion above the step portion 26 of the base member protruding portion 221 comes into contact with a side surface of the erecting member protruding portion 211 that touches a side surface of the base member protruding portion 221 on an inside of the opening 27.

In FIG. 2B and FIG. 2C, a space S (FIG. 2C) is generated between the opening 27 of the erecting member protruding portion 211 and the base member protruding portion 221 when the base member protruding portion 221 is inserted into the opening 27. However, the base member protruding portion 221 may be engaged with the opening 27 of the erecting member protruding portion 211 such that the space S is not generated. In this case, it is possible to further contribute to safety at the time of temporary assembly work until clamping of the bolt 25 is completed when the erecting member 21 is vertically arranged on the base member 22, or positioning of the erecting member 21 with respect to the base member 22.

Next, a description will be given of a third embodiment of the injection molding apparatus including the mounting stand of the invention using FIG. 3A, FIG. 3B, and FIG. 3C. A description of the same configuration as that of the first and second embodiments described above will be omitted.

Figure 3A:
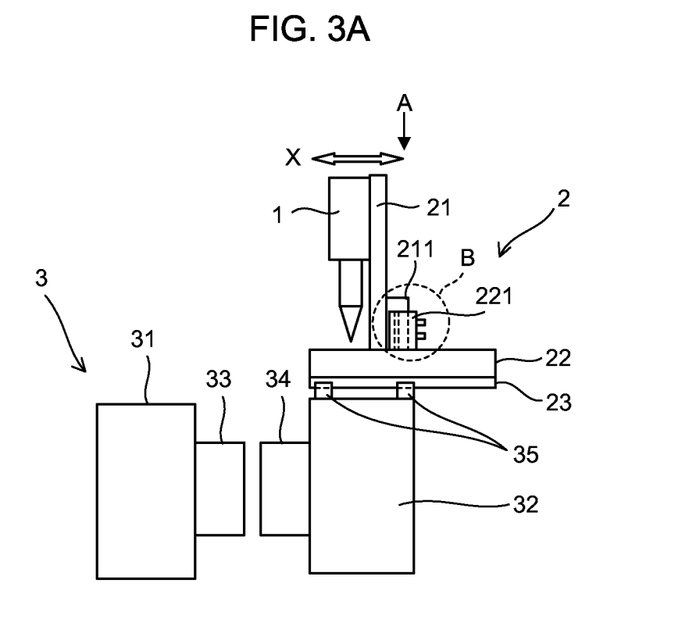
FIG. 3A is an overall view of an injection molding apparatus including a mounting stand according to a third embodiment of the invention.
Figure 3B:
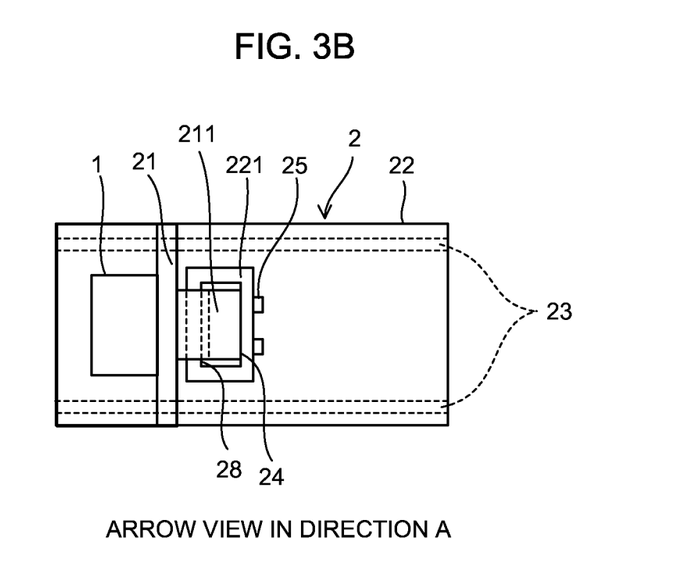
FIG. 3B is a diagram of the mounting stand illustrated in FIG. 3A as viewed in a direction A.
Figure 3C:
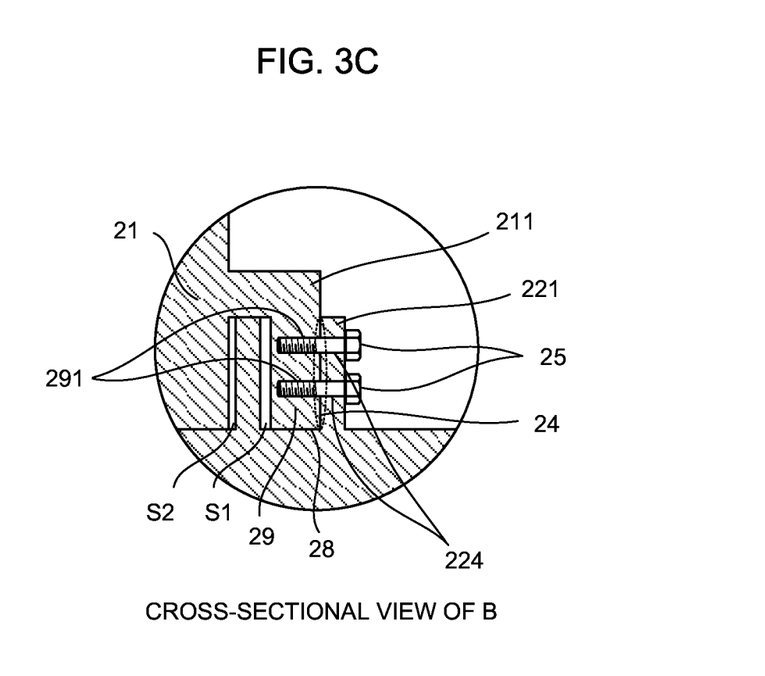
FIG. 3C is an enlarged cross-sectional view of a portion B indicated by a dotted line in FIG. 3A.

As illustrated in FIG. 3A to FIG. 3C, in the present embodiment, a depression 28 which is open upward is provided in a base member protruding portion 221, an insertion portion 29 extending downward is formed at a portion of an erecting member protruding portion 211, and the depression 28 is inserted into the insertion portion 29. In addition, as illustrated in FIG. 3C, an anchored portion 24 is configured by engaging a through-hole 224 provided in the base member protruding portion 221 with a bolt hole 291 provided in the insertion portion 29 of the erecting member protruding portion 211 using a bolt 25.

In FIG. 3B and FIG. 3C, when the insertion portion 29 of the erecting member protruding portion 211 is inserted into, and anchored to, the depression 28 of the base member protruding portion 221, a space S1 is generated between the insertion portion 29 and the depression 28, and a space S2 is generated between a side surface of an erecting member 21 and a side surface of the base member protruding portion 221 of the base member 22. However, engagement may be performed without providing one of or both the spaces S1 and S2. In this case, as described above, it is possible to further contribute to safety at the time of temporary assembly work until clamping of the bolt 25 is completed when the erecting member 21 is vertically arranged on a base member 22, or positioning of the erecting member 21 with respect to the base member 22. In addition, even though a lower end of the insertion portion 29 of the erecting member protruding portion 211 comes into contact with a bottom surface of the depression 28 of the base member protruding portion 221 in FIG. 3C, this configuration may not be adopted. Further, even though the base member protruding portion 221 is formed in a tubular shape having a rectangular cross section due to the presence of the depression 28 in FIG. 3B, the base member protruding portion 221 may be provided in a channel shape having a U-shaped cross section. In this case, the insertion portion 29 of the erecting member protruding portion 211 may not be formed in an inverted L-shape illustrated in FIG. 3C.

In the present embodiment, a description has been given of the vertical type injection apparatus as the injection apparatus attached to the mounting stand. However, the description may be applied when a mounting stand for a horizontal type injection apparatus is adopted.

The invention claimed is:

1. A mounting stand for an injection apparatus, the mounting stand comprising:
    a base member;
    an erecting member which is vertically arranged on the base member and to which the injection apparatus is attached;
    a base member protruding portion provided on an upper surface of the base member around a portion of the base member that comes into contact with the erecting member;
    an erecting member protruding portion provided on a side surface of the erecting member around a portion of the erecting member that comes into contact with the base member; and
    an anchored portion at which a side surface of the base member protruding portion is anchored to a side surface of the erecting member protruding portion,
    wherein the mounting stand is movable with respect to a support that supports the base member of the mounting stand.

2. The mounting stand according to claim 1, wherein the erecting member protruding portion is engaged with the base member protruding portion.

3. The mounting stand according to claim 1, wherein the anchored portion is anchored by a bolt.

4. An injection molding apparatus comprising:
    the mounting stand for the injection apparatus according to claim 1; and
    a support that supports the base member of the mounting stand,
    wherein a supported portion is provided, along a direction in which the mounting stand is movable, to the base member of the mounting stand at a portion where the base member is supported by the support, and
    the support is provided to a mold clamping device.

5. The injection molding apparatus according to claim 4, wherein the support is provided on a frame of the mold clamping device.

6. The injection molding apparatus according to claim 4, wherein the support is provided on a fixed platen of the mold clamping device.

7. The injection molding apparatus according to claim 4, wherein the support is provided on a movable platen of the mold clamping device.

* * * * *